INVENTOR.
GERHARD KRACHT
BY Barthel & Bugbee
ATTORNEYS

INVENTOR.
GERHARD KRACHT

Dec. 21, 1965    G. KRACHT    3,224,039
EXPANDED PLASTIC MOLDING MACHINE
Filed Oct. 25, 1963    4 Sheets-Sheet 4
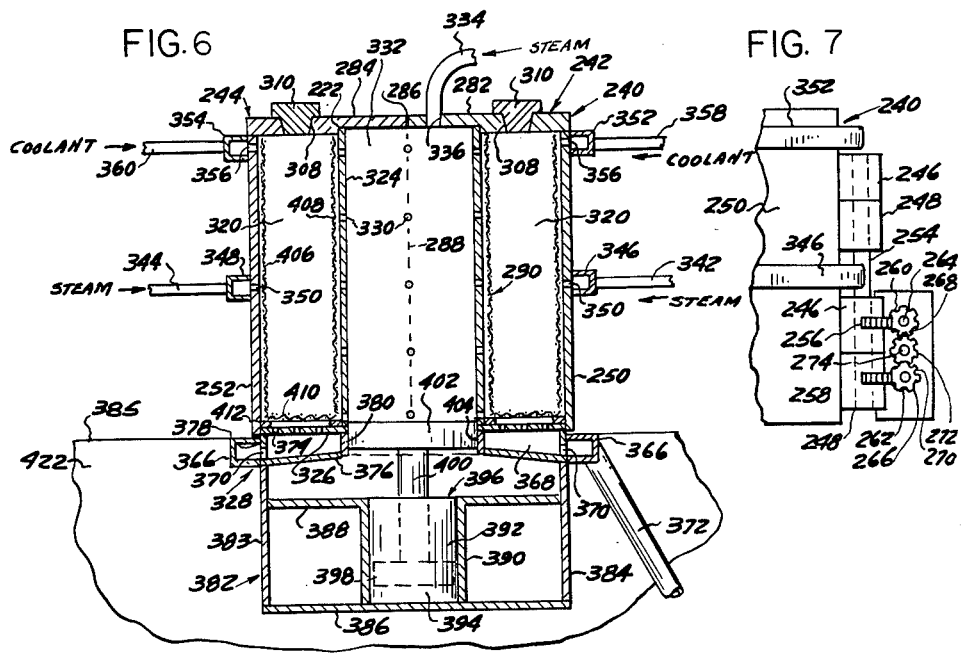
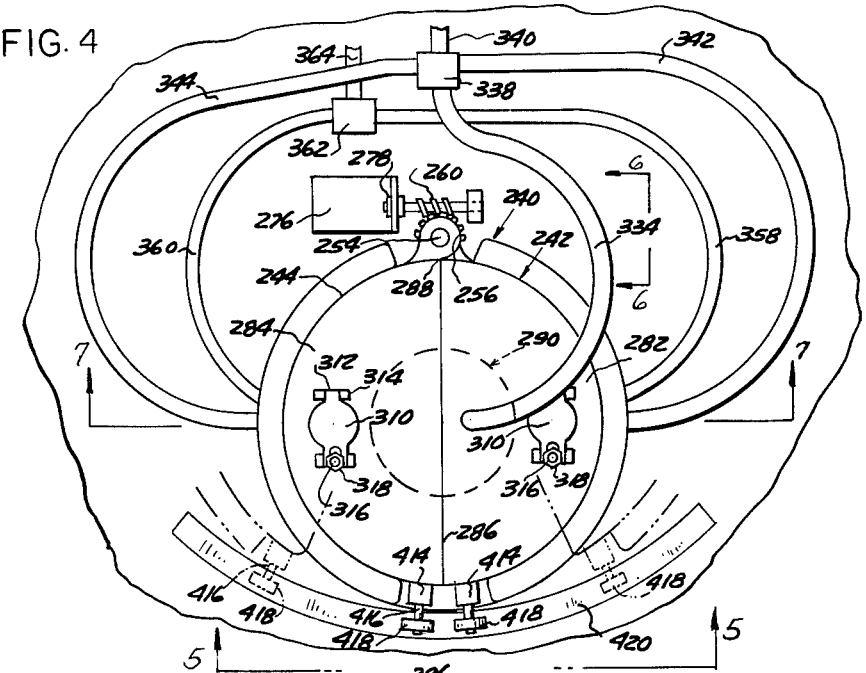
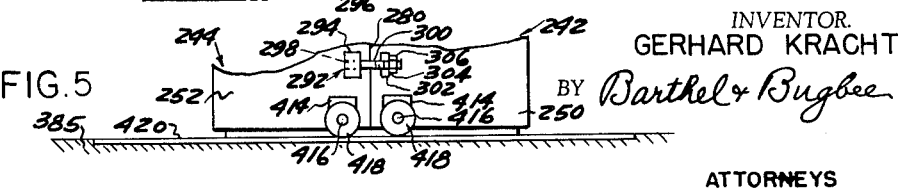
INVENTOR.
GERHARD KRACHT
BY Barthel & Bugbee
ATTORNEYS 3,224,039
EXPANDED PLASTIC MOLDING MACHINE
Gerhard Kracht, Allen Park, Mich., assignor to Swedish Crucible Steel Company, Detroit, Mich., a corporation of Michigan
Filed Oct. 25, 1963, Ser. No. 318,978
3 Claims. (Cl. 18—5)

This invention relates to molding and, in particular, to machines for forming expanded plastic articles.

One object of this invention is to provide a machine for forming expanded plastic articles adapted to receive the plastic material in the form of plastic beads and expand such material into a foam plastic article, such as a hollow cylinder.

Another object is to provide a molding machine of the foregoing character having means for supplying steam or other hot fluid for performing the expansion and preferably also means for removing the condensate produced as a result of the condensation of the steam.

Another object is to provide a molding machine of the foregoing character wherein means is additionally provided for supplying a cooling agent, such as water, to cool the mold walls in order to slightly shrink the adjacent molded article walls for facilitating easy removal of the molded article from the machine.

Another object is to provide a molding machine of the foregoing character wherein the bottom wall of the mold is movable vertically, such as by reciprocatory fluid pressure motors, in order to quickly and easily eject the molded article produced by the expanding action of the machine.

Another object is to provide a molding machine of the foregoing character wherein the mold is equipped with a swinging lid or cover also preferably equipped with means for admitting and exhausting a hot fluid, such as steam, for producing the expansion of the plastic beads, power-operated means being also provided for swinging the cover between its closed and open positions, and for clamping the cover against the rim of the mold body to produce a steam-tight junction therebetween.

Another object is to provide a molding machine of the foregoing character wherein the cover clamping device includes series of circumferentially-spaced keepers and hydraulically-operated clamps which automatically swing into position over the keepers and then pull downward upon the keepers to produce a steam-tight seal between the mold body and mold cover.

Another object is to provide a molding machine of the foregoing character wherein the mold body is equipped with a perforated inner wall which is spaced away from the outer wall so as to provide a steam chamber therearound from which the steam can contact the plastic mold charge throughout substantially its entire extent, not only at the sides but also preferably at the top and bottom as well.

Another object is to provide a molding machine, as set forth in the object immediately preceding, wherein the mold is provided with a central hollow cylindrical core likewise having a perforated outer wall spaced radially away from the main inner wall to provide a similar chamber around the exterior of the core.

Another object is to provide a modified molding machine wherein the mold includes a pair of mold halves which are swingable horizontally into and out of engagement with each other around a vertical axis and a detachable hollow cylindrical mold core, so that, when the mold halves are swung open after expansion of the plastic beads, the resulting hollow cylinder of molded foam plastic may be withdrawn horizontally, together with the hollow cylindrical mold core, and then subjected to cutting or other processing as set forth above in connection with the principal form of the invention.

Other objects and advantages of the invention will become apparent during the course of the following description of the accompanying drawings, wherein:

FIGURE 4 is a top plan view of a modified molding machine having separable horizontally-swingable mold halves for ejection of the molded body;

FIGURE 5 is a fragmentary front elevation of the lower front part of the modified molding machine of FIGURE 4, looking in the direction of the arrows 5—5 in FIGURE 4;

FIGURE 6 is a fragmentary side elevation of the rearward portion of the molding machine of FIGURE 4, looking in the direction of the arrows 6—6 in FIGURE 4; and FIGURE 7 is a central vertical section taken along the line 7—7 in FIGURE 4.

The expansion of plastic beads into a foam body from which foam sheeting can subsequently be cut has hitherto presented a serious problem, particularly as regards the successful production of large hollow cylinders of such foam plastic material from which great lengths of such sheeting can be cut. Previous efforts to produce such large expanded plastic cylinders have encountered difficulty in achieving uniformity of product, as well as in avoiding the melting together of the plastic beads which are expanded, and also in imprisoning excessive amounts of steam within the molded article. The production of large molded expanded plastic articles of the foregoing character has also been greatly hampered by the difficulty of the molded article adhering to the walls of the mold and being difficult to eject. Hitherto, when a hot fluid, such as steam, has been used to heat the mold, it has been difficult to achieve uniformity of heating of the mold walls, with a consequent variation in the quality of the expanded article in adjacent areas of different temperatures in the mold walls. The present invention provides a molding machine which eliminates these disadvantages and which quickly and easily produces large hollow cylindrical articles of expanded plastic from which extremely great lengths of foam plastic sheeting can be cut. The process of producing these large hollow cylindrical expanded plastic articles has been disclosed and claimed in my co-pending application Serial No. 257,224 filed Feb. 18, 1963, for Process of Producing Flexible Foam Polystyrene Sheeting.

Figure 1:
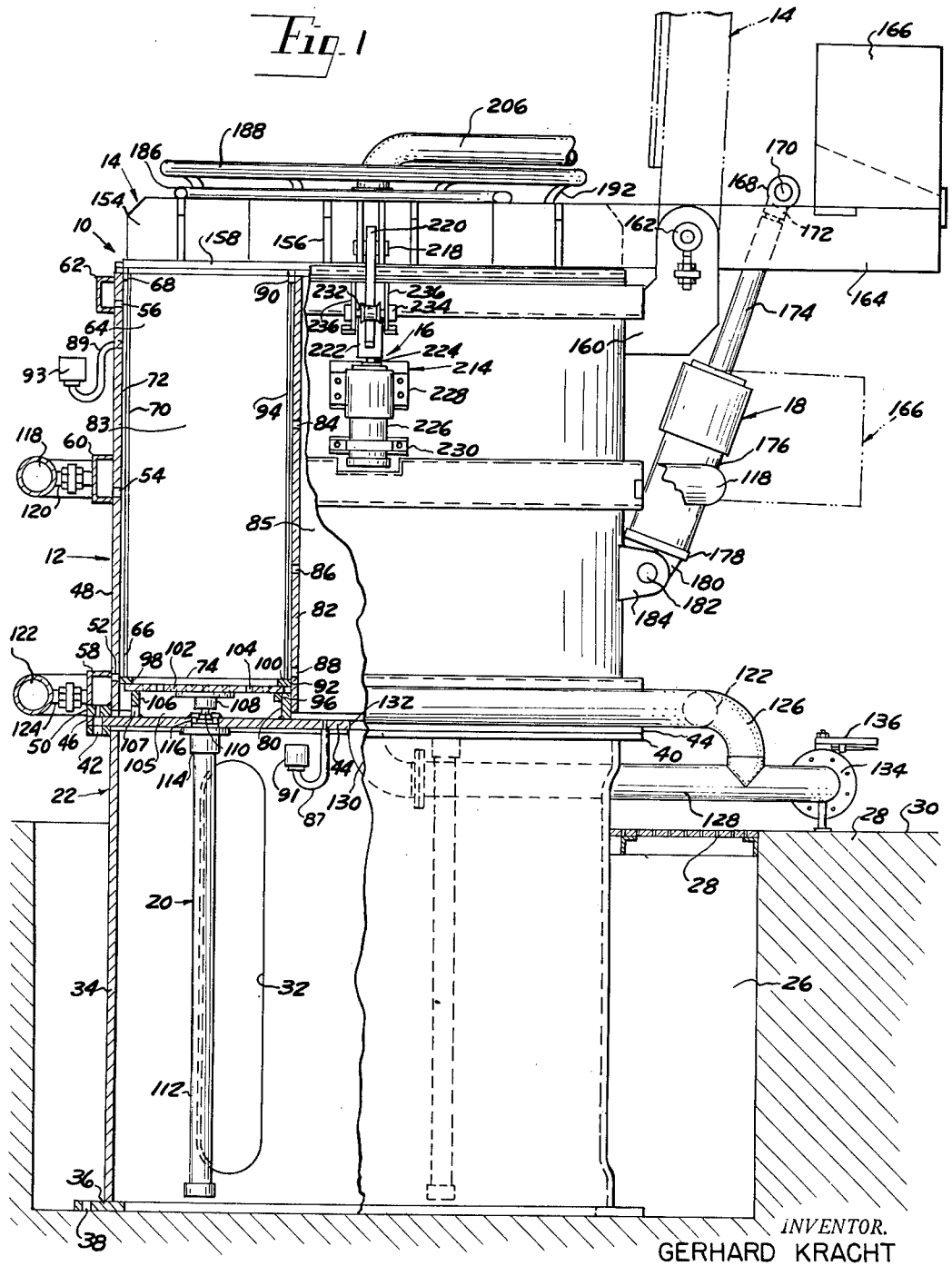
FIGURE 1 is a side elevation, partly in vertical section, of a molding machine according to one form of the invention, mounted in a pit shown in cross-section, with the raised position of the mold cover shown fragmentarily in dotted lines.
Figure 2:
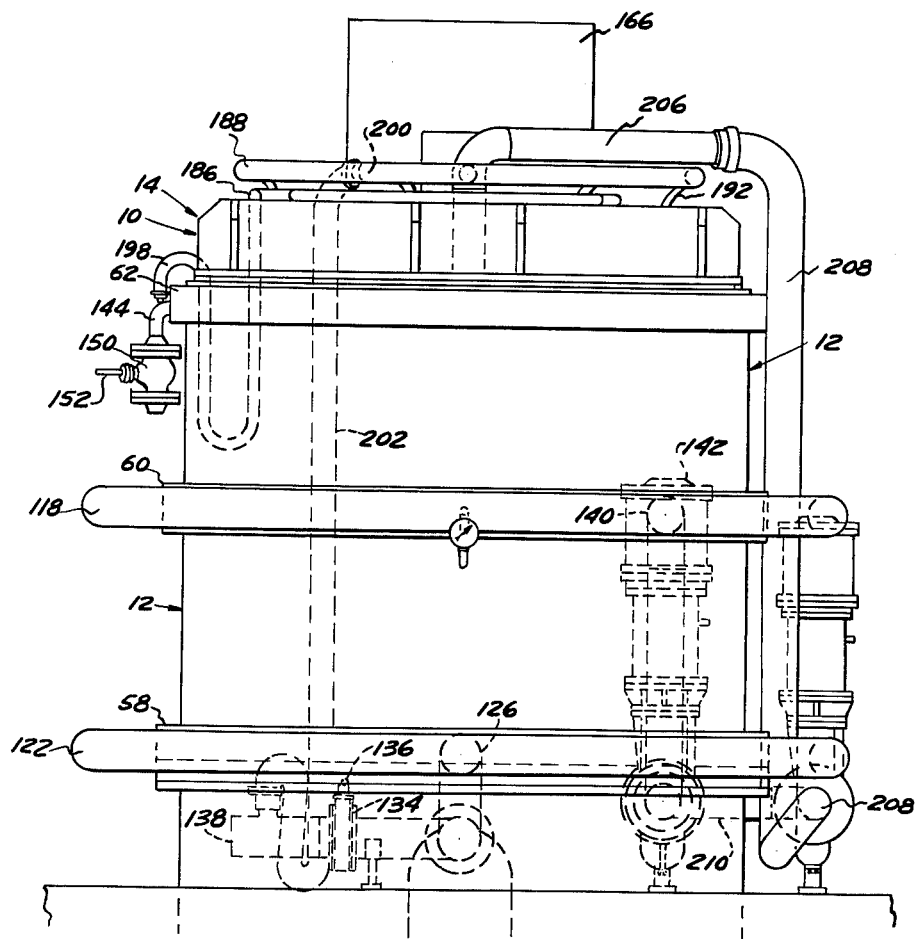
FIGURE 2 is a front elevation of the molding machine shown in FIGURE 1, with the hydraulic cover-clamping motors and their keepers omitted to simplify the showing.
Figure 3:
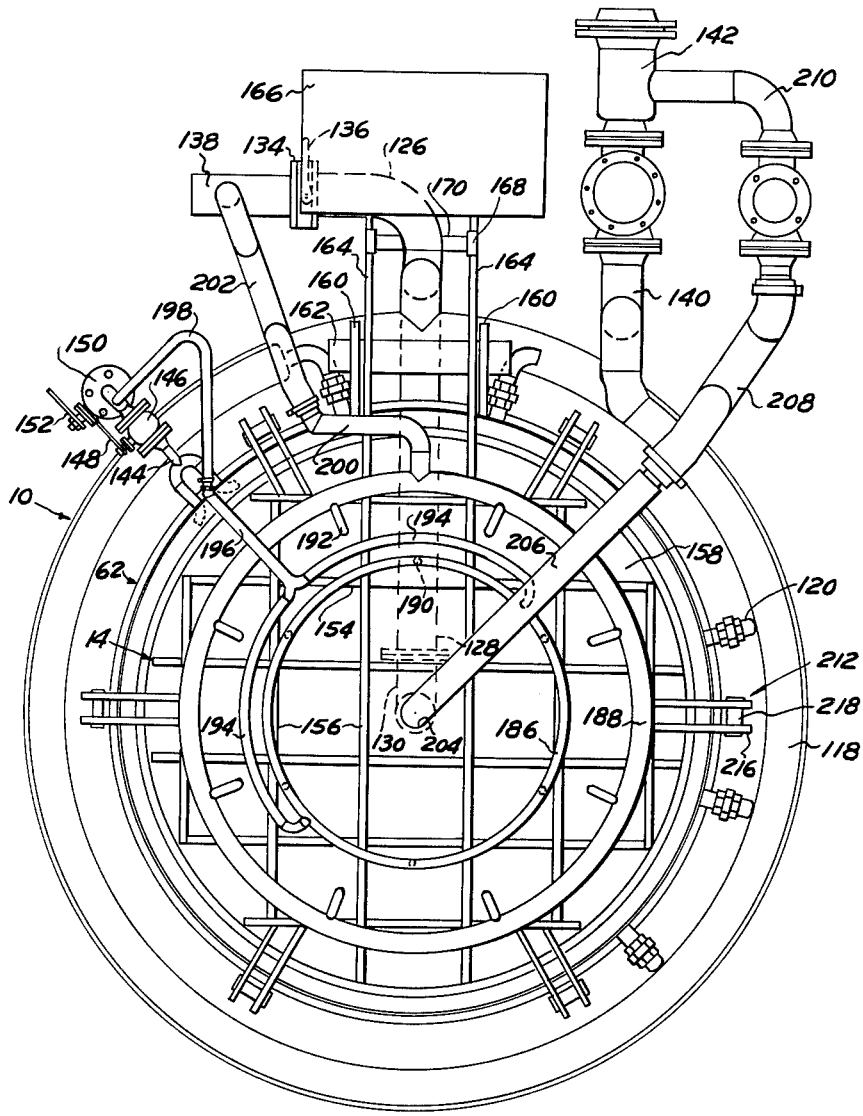
FIGURE 3 is a top plan view of the moding machine shown in FIGURES 1 and 2, showing the circumferentially-spaced cover-clamping keepers, but omitting the hydraulic clamping motors in order to simplify the showing.

Referring to the drawings in detail, FIGURES 1, 2 and 3 show a molding machine, generally designated 10, according to one form of the invention, as consisting generally of a hollow walled mold body 12 closed by a power-operated swing cover 14 which is clamped down against it by circumferentially-spaced clamping devices 16 (FIGURE 1) and swung by a reciprocatory hydraulic cover-operating motor 18, the molded article being expelled by three circumferentially-spaced reciprocatory hydraulic ejection motors 20. The mold body 12 is supported upon a hollow cylindrical base or foundation 22 upon the bottom 24 of a pit 26, the top of which is closed by an annular access grating 28 (FIGURE 1). The pit 26 is formed in a concrete floor 28 having a floor surface 30. A vertically-elongated access opening or doorway 32 is provided in the cylindrical side wall 34 of the foundation 22, and the side wall 24 rests upon a base ring 36 to which it is welded or otherwise joined, the base ring having bolt holes 38 for the insertion of fasteners, such as lag screws, extending downward below the bottom wall 24 of the pit 26. Also welded or otherwise secured to the top of the cylindrical side wall 34 is a mounting ring 40 which, in effect, provides a mounting flange having bolt holes 42 therein through which the mold body 12 is secured to the foundation 22.

For this purpose, the mold body 12 is provided with a disc-shaped base plate 44 (FIGURE 1) having circumferentially-spaced bolt holes 46 aligned with the bolt holes 42 for receiving hold-down bolts (not shown). Resting upon and bolted or otherwise secured to the base plate 44 is a peripheral lower base flange 50 to which is welded or otherwise secured the lower end of the outer side wall 48, which is spaced slightly above the base flange 50. The latter is circumferentially drilled in alignment with the bolt holes 42 and 46 for the reception of the same holddown bolts.

The outer side wall 48 is provided with lower, intermediate and upper ports 52, 54 and 56 of proportionately large, medium and small diameters respectively (FIGURE 1) arranged in circumferentially-spaced relationship around the side wall 48. Encircling the side wall 48 adjacent the ports 52, 54 and 56 are lower, intermediate and upper manifolds 58, 60 and 62 respectively. As described subsequently below, the lower manifold 58 receives and carries away condensate formed by the condensation of steam and admitted through the intermediate manifold 60 which is a steam supply manifold. The upper manifold 62 is a cooling fluid supply manifold for the reception of a cooling fluid, such as cold water, for the purpose of shrinking the molded article after expansion has been completed, in order to more easily remove it from the hollow cylindrical mold cavity 64 within the mold body 12. Welded or otherwise secured to the side wall 48 are lower and upper rings 66 and 68 respectively which support the lower and upper ends of a perforated cylindrical outer side wall 70 spaced radially away from the outer side wall 48 to provide a circumferential steam chamber 72 therebetween (FIGURE 1). The outer side wall 70 is of the same construction as a perforated annular bottom wall 74 in that it contains rows of elongated narrow slits spaced narrowly apart from one another so that the wall is open for a large percentage of its area so as to permit the maximum contact of the fluid passing therethrough with the molded material inside the mold cavity 64 yet at the same time provide adequate structural strength to support and withstand the pressure of the molded material and the hollow cylindrical workpiece produced by the expansion thereof.

Mounted on and secured as by welding to the base plate 44 is a low cylindrical member 80 to which a hollow cylindrical core 82 is secured, as by bolts or other fasteners (not shown). The cylindrical outer wall 48 and core 82 define a mold cavity 83. The lower end of the core 82 is spaced a slight distance above the base plate 44 and its interior constitutes a core chamber 85. The top of the core 82 is approximately on the same level as the top of the outer side wall 48, and, like the latter, is provided with vertically-spaced rows of upper, intermediate and lower circumferentially-spaced ports 84, 86 and 88. The base plate 44 and the outer wall 48 are drilled to receive pipes 87 and 89 on which are mounted safety pressure relief valves 91 and 93 respectively. Secured as by welding to the cylindrical core 82 near its upper and lower ends are upper and lower mounting rings 90 and 92 (FIGURE 1) for a perforated cylindrical inner side wall 94. The latter is of the similar elongated-slit construction as the perforated outer side wall 70 and bottom wall 74 described above. Welded or otherwise secured to the cylindrical stop member 80 near the top thereof is a ring 96.

Secured to the lower side of the perforated annular bottom wall 74 are outer and inner supporting rings 98 and 100 respectively which in turn rest upon and are secured to a perforated annular bottom plate or wall 102 having multiple ports 104 therein (FIGURE 1) leading to an annular bottom chamber 105 beneath it. Welded to the under side of the bottom wall 102 near the outer periphery thereof is a stop ring or low cylindrical member 106, the lower edge of which is spaced above the base plate 44 (FIGURE 1) to provide passageways 107 leading to the condensate manifold 58. Welded, bolted or otherwise secured to the under side of the bottom wall 102 is a flanged bushing 108, similar flanged bushings 108 being secured at circumferentially-spaced locations around the under side of the base plate 102 (FIGURE 4). Seated in each flanged bushing 108 is the upper end of a piston rod 110, to the lower end of which is secured a piston head (not shown) reciprocable within an elongated hydraulic cylinder 112. The hydraulic cylinder 112, of which there are three, at its upper end is secured to a flanged head 114 which in turn is bolted or otherwise secured to the under side of the base plate 44 in line with a hole 116 through which the piston rod 110 passes. As a consequence, as explained below in connection with the operation of the invention, when hydraulic pressure fluid is admitted to the lower ends of the hydraulic cylinders 112, the piston rod 110 and flanged bushings 108 attached thereto move upward, carrying with them the bottom wall 102 and its inner wall 74 to eject the molded plastic foam block which constitutes the workpiece.

Extending around the midportion of the mold body 12 on the same level as the steam manifold 60 is an annular steam supply pipe 118 which is connected at circumferentially-spaced intervals to the steam manifold 60 by short radial pipes 120 (FIGURE 1). Similarly, a condensate drain pipe 122 encircles the mold body 12 near the lower end thereof on substantially the same level as the condensate drain manifold 58 and is connected thereto at circumferentially-spaced intervals by short radial pipes 124. The annular condensate drain pipe 122 is connected by a curved pipe 126 to a main condensate drain pipe 128 leading inwardly to a curved pipe 130 which in turn is connected to a large port 132 in the center of the bottom wall 44 (FIGURE 1) leading into the core chamber 85. The main condensate drain pipe 128 leads outwardly to a valve 134 (FIGURES 1 and 3) having a control handle or lever 136 by which the valve 134 may be closed or opened. The valve 134 is connected by a pipe 138 to a suitable place of disposal of the condensate (not shown).

In a similar manner, the annular steam pipe 118 is connected by a branch pipe 140 (FIGURE 3) to a main steam supply coupling 142 which in turn is connected to a steam boiler or other suitable source of heating steam (not shown). Connected to the upper or cooling water manifold 62 is a cooling water supply pipe 144 (FIGURE 3) connected to an auxiliary cooling water control valve 146 having a control handle or lever 148. The auxiliary water control valve 146 is connected to a main water control valve 150 having a control handle or lever 152. The main water valve 150 is connected to a water main or other suitable source of cooling water (not shown).

The swinging cover 14 is circular in outline and is provided with crisscrossed ribs 154 and 156 (FIGURES 1 and 3) extending upwardly from the disc-shaped cover plate 158 which actually closes the mold cavity 83 and core chamber 85. Secured to the rearward edge of the mold body side wall 48 in spaced relationship are two upstanding pivot brackets 160 which support the opposite ends of a pivot shaft or hinge shaft 162. Pivotally mounted on the pivot shaft 162 between the brackets 160 are the spaced parallel extensions 164 of two of the cover reinforcement ribs 156. The extensions 164 project rearwardly a considerable distance behind the pivot shaft 162 and support a counterweight 166 (FIGURES 1 and 3) which counterbalances the weight of the mold cover 14. Secured to the upper edges of the reinforcement rib extensions 164 are two upstanding bearing blocks 168 which in turn pivotally support a cross shaft 170 to the center of which is connected a cross head 172 (FIGURE 1) mounted on the upper end of the piston rod 174 of the reciprocatory hydraulic motor 18 having a cylinder 176 within which a piston head (not shown) mounted on the lower end of the piston rod 174 is reciprocable. Secured as by welding to the cylinder 178 at the lower end of the cylinder 176 (FIGURE 1) is a downwardly-projecting arm structure 180 which pivotally engages a pivot shaft 182, the opposite ends of which are supported in spaced parallel brackets 184 (only one of which is shown in FIGURE 1) welded or otherwise secured to the cylindrical outer wall 48 of the mold body 12.

Mounted on the top of the mold cover 14 and resting upon the reinforcing ribs 154 and 156 thereof (FIGURE 3) are concentric annular cooling water and condensate drain manifolds 186 and 188 respectively connected by multiple circumferentially-spaced short branch pipes 190 and 192 respectively to ports (not shown) in the cover plate 158 opening into the mold cavity or chamber 83. Cooling water is supplied to the inner cooling water manifold 186 through arcuate pipes 194 which in turn are connected to a radial branch pipe 196, and this in turn is connected by a flexible hose 198 to the outlet side of the main cooling water control valve 150. Similarly, the outer annular condensate manifold 188 is connected to a branch pipe 200 (FIGURE 3) to the outer end of which is connected a flexible hose 202 leading downward to the condensate drain pipe 138. Finally, steam is supplied to the central core chamber 85 through a central port 204 in the cover plate 158 by a generally radial steam pipe 206, to the outer end of which is connected a flexible steam hose 208. The outer end of the steam hose 208 is connected to a branch pipe 210 leading to the main steam supply coupling 142.

Secured to the rim of the mold cover 14 at circumferentially-spaced intervals therearound and projecting radially therefrom are multiple keepers, generally designated 212 (FIGURE 3), of the multiple clamping devices 16 (FIGURE 1) and engaged and locked by the hydraulic locking units 214 thereof. Each keeper, of which there are six shown in FIGURE 3, consists of a pair of spaced vertical parallel plates 216 welded or otherwise secured at their inner ends to the lid or cover 14 and interconnected at their outer ends by keeper pins 218. Engageable with each keeper pin 218 (FIGURE 1) is the notched upper end of a latch lever 220. The lower end of the latch lever 220 is pivotally mounted on a yoke 222 which in turn is mounted on the upper end of a piston rod 224. The piston rod 224 on its lower end carries a piston head (not shown) which is reciprocably mounted in a hydraulic cylinder 226 bolted or otherwise secured by brackets 228 and 230 to the side of the mold body outer wall 48 at spaced locations therearound corresponding to the spaced locations of the keepers 212.

Intermediate the upper and lower ends of the latch lever 220 is mounted an axle 232, the opposite ends of which carry cam rollers 234 which slide in cam-slotted vertical parallel plates 236 spaced horizontally apart from one another. The plates 236 are so slotted that as the piston rod 224 rises, the cam rollers swing the upper end of the latch levers 220 outward to disengage their notched upper ends from the keeper pins 218 and thus free the cover or lid 14 of the molding machine 10 for opening.

Conversely, admitting pressure fluid to the upper end of each clamping cylinder 226 and the consequent downward travel of the piston rod 224 and yoke 222 swings the notched upper end of the latching lever 220 inward into latching engagement with its respective latch pin 218 and then downward to clamp the cover 14 tightly against the upper rim of the mold body 12.

In the operation of the invention, let it be assumed that plastic material, preferably finely-divided and containing an expanding or "blowing" agent has been made available for filling the mold 10. Such material, for example, may consist of pre-expanded polystyrene plastic beads produced in the manner described in my co-pending application Serial No. 257,224 filed February 8, 1963, for Process of Producing Flexible Foam Polystyrene Plastic Sheeting. To fill the mold cavity 83 of the molding machine 10, hydraulic pressure fluid is admitted to the top of the hydraulic cover-operating motor 18 from a suitable source of hydraulic pressure fluid, such as a hydraulic pump or hydraulic accumulator (not shown), whereupon the piston rod 174 is driven downward as hydraulic fluid is exhausted from the bottom of the cylinder 176. This action swings the extensions 164 of the reinforcing ribs 156 downward (FIGURE 1), swinging the cover 14 upward away from the mold body 12 and thus opening up the annular mold cavity of the chamber 83.

Meanwhile, of course, it is assumed that the latching devices 16 have been operated to retract the latch levers 220 from latching engagement with the latch pin 218 to permit raising the cover 14, and that the pistons connected to the piston rods 110 of the hydraulic ejection motors 20 have been retracted downward within their respective cylinders 112 to lower the bottom wall 102 to the bottom of the mold cavity or chamber 83.

The operator now fills the mold cavity or chamber 83 to a predetermined level with the plastic material, this level depending upon the extent to which the material has been pre-expanded and the extent to which it is desired to continue to expand it into a hollow cylindrical block of foam plastic material corresponding substantially in size and shape to that of the mold chamber 83. If pre-expanded plastic beads are employed, such as polystyrene beads containing an expanding agent such as pentane, they may be transferred to the mold chamber 83 through a flexible hose in the manner described in my above-identified co-pending application. If low density pre-expanded beads of densities from 0.40 to 0.75 pound per cubic foot are used, the mold cavity 83 may be completely filled because pre-expansion has been almost complete. If, on the other hand, the pre-expanded beads are of higher density than 0.75 pound per cubic foot, the mold cavity 83 is incompletely filled to an amount varying from ⅝ to ⅞ of its capacity, thereby leaving a space for further expansion at the top of the mold cavity.

After the mold cavity 83 has been filled to the extent desired, hydraulic fluid is admitted to the bottom of the hydraulic cylinder 176 of the hydraulic cover-operating motor 18, causing the piston rod 174 to be moved upward and consequently swinging the cover 14 downward into closing engagement with the top of the mold body 12. Hydraulic fluid is then admitted to the upper ends of the clamping cylinders 16, causing their piston rods 224 and yokes 222 to move downward, and consequently swinging the notched upper ends of the latch levers 220 inward and downward into clamping engagement with their respective latch pins 218. This action tightly holds and seals the cover 14 down against the mold body 12.

Steam at approximately 75 pounds per square inch pressure and 250° F. temperature is then introduced to the mold cavity or chamber 83 by supplying it from the main steam supply coupling 142 and branch pipe 140 to the manifold 118 (FIGURE 3) whence it flows through the circumferentially-spaced ports 54 in the outer side wall 48 of the mold body 12 and through the slits of perforated outer side wall 70 after filling the steam chamber 72 therebetween (FIGURE 1). At the same time, steam at the same temperature and pressure flows through the branch pipes 210 and 206 and hose 208 through the port 204 in the top of the mold cover 14 into the central core chamber 85 and thence through the ports 84, 86 and 88 in the inner wall 82 and through the slits in the perforated inner wall 94 into the mold cavity or chamber 83. When the pressure in the mold cavity 83 reaches 15 pounds per square inch, the steam supply is automatically cut off. Condensate resulting from the condensing steam escapes through the slits in the perforated bottom wall 74 and ports 104 in the bottom wall 102 into the bottom chamber 105 and thence through passageways 107 and ports 52 into the condensate manifold 58, whence it is drained off from time to time through the pipes 124 into the manifold 122, pipes 126 and 128 and valve 134. At the same time, condensate collecting in the core chamber 85, drains off through the port 132 into the branch pipe 130 and thence through the pipe 128 and valve 134 to a location of disposal.

In response to the heat of the steam in the mold cavity 83, the plastic beads now expand to their maximum extent permitted by the interstices between them and by any space which may have been left at the top of the mold cavity 53 to fill the latter, and at the same time unite themselves to one another to form a hollow cylindrical foam plastic body or block of the shape of the annular mold cavity 83. The steam entering through the main steam coupling 142 is then shut off, and a cooling agent, such as cool water, is then introduced through the valves 146 and 150 (FIGURE 3) and the pipes 144 and 198 to the cooling water manifold 62 at the top of the mold body 12 and the cover cooling water manifold 186 respectively, whence it flows into the mold chamber through the ports 56 (FIGURE 1) and the branch pipes 190 in the cover 14 (FIGURE 3). The cool water acts upon the molded foam plastic body to cause shrinkage. This shrinkage is permitted to go on for several minutes, so as to facilitate detachment of the molded foam plastic block from the side walls 70 and 94 of the mold cavity 83. If no such cooling agent is introduced, the plastic bead layers immediately adjacent the mold walls 70 and 94 rupture as a result of the excessive heat which they receive therefrom, in contrast to the lower heat received by the beads in the interior of the block.

Following the cooling step, the cooling water is shut off and drained off from the bottom of the mold body 12 in the manner described above for the condensate. The molded foam plastic block, now loosened slightly from its previous tight engagement with the side walls 70 and 94, is ready to be ejected from the mold cavity 83. To do this, the operator admits hydraulic fluid to the lower ends of the clamping cylinders 226, causing the yokes 222 and notched clamping bars 220 of the hydraulic clamping devices 16 to rise and swing outward out of engagement with the keeper pin 218. Hydraulic fluid is then supplied to the upper end of the hydraulic cylinder 176 of the mold operating motor 18, pulling the piston rod 174 downward and consequently swinging the cover 14 of the molding machine 10 open in an upward direction around its pivot shaft 162 into the dotted line position shown in FIGURE 1. The operator then supplies hydraulic pressure fluid to the lower end of the cylinders 112 of the hydraulic ejector motors 20, causing their piston rods 110 and perforated bottom 102 to move upward through the mold cavity 83, lifting out of the latter the annular molded foam plastic block resting upon the perforated inner bottom 74. This action strips the block from the inner side walls 70 and 94 of the mold body 12 and raises the bottom of the foam plastic block to the level of the upper rim of the mold body 12 at the top of the mold cavity 83. The foam plastic block is then removed in any suitable manner, such as by a chain hoist or other hoisting device connected to an overhead conveyor. The latter transfers the molded foam plastic block, while still hot, to either a hot storage chamber maintained at a predetermined hot temperature, or directly to the supporting mandrel or shaft of a slicing machine for slicing the block into a sheet or strip of expanded foam plastic material, as described in my above-identified co-pending application.

The modified molding machine, generally designated 240, shown in FIGURES 4 to 7 inclusive, embodies the general principles of and accessory components and connections of the molding machine 10 of FIGURES 1 to 3 inclusive, hence is shown in diagrammatic and simplified form with most of these accessories and components omitted in order to simplify the disclosure. The molding machine 240 differs primarily from the molding machine 10 of FIGURES 1 to 3 inclusive by being formed in halves 242 and 244 which are swingable apart from one another into the dotted line positions shown fragmentarily in FIGURE 4, in order to permit removal of the hollow cylindrical expanded foam plastic block produced as a result of the operation of the molding machine 240, as described more fully below.

The mold halves 242 and 244 are provided with pairs of rearwardly-projecting bearing bosses 246 and 248 respectively (FIGURE 6) secured to the side walls 250 and 252 respectively and bored coaxially to receive a pivot shaft 254. Secured to and movable unitarily with the lower bearing bosses 246 and 248 are quadrant worm gears 256 and 258 respectively. Meshing with the quadrant worm gears 256 and 258 are worms 260 and 262 respectively (FIGURE 6) mounted on worm shafts 264 and 266 respectively. Mounted on the end of each worm shaft 264 and 266 is a spur gear 268 and 270 respectively meshing with opposite sides of a spur gear 272 mounted on the shaft 274 of a motor 276. The shafts 264, 266 and 274 are journaled in suitable bearings, such as at 278 (FIGURE 4), the bearings for the opposite ends of these shafts being conventional and omitted from the drawing to avoid obscuring the showing of the gearing in the lower right-hand corner of FIGURE 6. It will be understood that the shafts 264, 266 and 274 may be journaled in any suitable conventional way, the details of which are beyond the scope of the present invention.

The mold halves 242 and 244 are so arranged that their approximately semi-cylindrical side walls 250 and 252 meet upon a substantially vertical diametral parting plane having a front parting line 280 (FIGURE 5). The mold halves 242 and 244 are provided with approximately semi-circular top wall halves 282 and 284 respectively (FIGURE 4) which meet upon a parting line 286 also lying in substantially the same vertical diametral parting plane as the front parting line 280. There is, of course, a rear parting line 288 disposed a short distance forwardly of the pivot shaft or hinge shaft 250 (FIGURE 4) and shown in dotted lines in FIGURE 7. The actual rearward parting line in FIGURE 7 is concealed behind the cylindrical mold core, generally designated 290. It will be understood that the mold halves 242 and 244 at the parting lines 280, 286 and 288 are provided with suitable gaskets (not shown) of conventional form which have been omitted to simplify the disclosure and which coact with one another to prevent excessive escape of steam during operation. The mold halves 242 and 244 are also provided with a plurality of clamping devices, generally designated 292, spaced vertically apart from one another along the vertical parting line 280 (FIGURE 5). In actual practice, the clamping devices 292 would be similar to the clamping devices 16 of FIGURE 1 operated by similar fluid pressure cylinders but disposed horizontally instead of vertically. For simplicity of showing, however, the clamping devices 292 of FIGURE 5 have been illustrated as consisting of a bearing yoke 294 supporting a pivot shaft 296 upon which the annular hub 298 of a swinging clamping bolt 300 is pivotally mounted. The clamping bolt 300 swings into and out of a horizontal U-shaped notch 302 in a keeper boss or lug 304 secured as by welding to the mold half 242 and carrying a clamping nut 306 threaded thereon. Tightening of the nut 306 on the swinging clamping bolt 300 against the notched lug or keeper 304 pulls the mold halves 242 and 244 tightly into engagement with one another along their vertical and horizontal parting lines 280 and 286 respectively.

The top walls 282 and 284 of the mold halves 242 and 244 are integral with and secured as by welding to the semi-cylindrical side walls 250 and 252 thereof and are provided with filling ports 308 which are closed by closure plugs 310. The ports 308 and their closure plugs 310 are preferably tapered in order to provide tight sealing, and are also preferably provided with conventional sealing gaskets (not shown). The closure plugs 310 are preferably hinged as at 312 (FIGURE 4) to bearing bosses or yokes 314 secured to and projecting upwardly from the mold top halves 282 and 284 and welded or otherwise secured thereto. In a manner similar to that of the clamping devices 292, each closure plug 310 on the side opposite the hinged portion 312 is provided with a notched keeper (not shown) which receives the shank of a swinging bolt 316 carrying a clamping nut 318 threaded thereon. In actual practice, a hand wheel or the like would be used on each nut 318 for more rapid operation. The filling ports 308 are provided for the insertion of a filling nozzle attached to a filling hose (not shown) by which the plastic beads are introduced into the annular mold chamber or cavity 320 (FIGURE 7) located between the side walls 250, 252 and the core 290, as explained below in connection with the operation of the invention.

Each top wall half 282 and 284 is provided with a semi-circular counterbore 322 (FIGURE 7) which collectively serve to receive and center the upper end of the inner hollow cylindrical wall 324 of the core 290, the lower end of which rests upon the perforated lower wall 326 of the annular hollow base, generally designated 328. The inner core wall 324 is provided with circumferentially-spaced and axially-spaced ports 330 (FIGURE 7) through which steam may escape from the core chamber 332 to the mold chamber or cavity 320 when supplied thereto through a steam conduit or hose 334 connected to a steam inlet port 336 in the top wall half 282. The opposite end of the steam hose 334 is connected to a coupling 338 supplied with steam through a steam supply conduit 340. From the coupling 338, flexible steam supply hoses 342 and 344 lead respectively to the steam manifold halves 346 and 348 of approximately semi-circular or arcuate form welded or otherwise secured to the approximate midportions of the side walls 250 and 252 in line with circumferentially-spaced steam inlet ports 350 therein opening into the mold cavity or chamber 320. Similar arcuate coolant manifold halves 352 and 354 are welded or otherwise secured to the upper portions of the side walls 240 and 252 respectively in line with circumferentially-spaced coolant inlet ports 356 likewise leading into the mold chamber or cavity 320. Flexible coolant conduits or hoses 358 and 360 are connected at their forward ends respectively to the coolant conduit halves 352 and 354 and at their rearward ends to a coolant coupling 362 (FIGURE 4) to which a coolant supply conduit 364 is connected and which in turn leads to a source of suitable coolant, such as water.

Secured to the base at the periphery thereof is an annular condensate and coolant drain manifold 366 (FIGURE 7) which communicates with the annular base chamber 368 through circumferentially-spaced ports 370. A drain conduit 372 leads from the drain manifold 366 to a suitable place of disposal. The perforated annular bottom plate 326 is provided with drain ports 374 leading downward into the annular base chamber 368, which has a bottom lower wall 376 and outer and inner annular walls 378 and 380 respectively. The hollow base 328 rests upon and is supported by an approximately cylindrical base support, generally designated 382, mounted in a floor pit below the floor level 385 and having a cylindrical outer wall 384, a bottom wall 386, an annular top wall 388 and a cylindrical inner wall 390 surrounding a cylindrical space 392. Mounted in the cylindrical space or pocket 392 is the hydraulic cylinder 394 of a reciprocatory hydraulic motor, generally designated 396, containing a reciprocatory piston 398 connected to the lower end of a piston rod 400. Mounted on the upper end of the piston rod 400 is a cylindrical centering head 402 which not only serves as a movable bottom wall for the core 290 but also serves to center it and prevent lateral shifting during operation. The centering head 492 is coaxial or concentric with the counterbores 322 in the top walls 282 and 284 (FIGURE 7). The head 402 reciprocates vertically within the bore 404 provided by the cylindrical inner wall 380 and may be retracted downward until flush with the bottom wall 326 for sliding horizontal removal of the molded hollow cylindrical foam plastic block after the completion of the molding operation.

The mold side wall halves 250 and 252 are provided with perforated liners or inner side walls 406 secured thereto in radially-spaced relationship, and the core 290 is similarly provided with a perforated cylindrical outer wall 408 similarly secured to the core wall 324 (FIGURE 7). In a similar manner, the base 328 is provided with an annular perforated liner 410 spaced vertically above the annular base 326 and secured thereto by annular spacing rings 412. The perforated walls 406 and 408, 410 are of material similar to that described above in connection with FIGURES 4 to 7 inclusive for the walls 70, 74 and 94 of the molding machine 10, hence require no additional description.

In order to assist in supporting the weight of the horizontally-swinging mold halves 242 and 244, and to reduce the leverage thereof upon the pivot shaft 254, each mold half is provided near the bottom of its parting line 280 with a wheel bracket 414 (FIGURES 4 and 5) in which is journaled a wheel shaft 416 rotably supporting a wheel 418 which in turn rests upon and rides along an arcuate track 420. The track 420 is preferably recessed into the floor 422 beneath the floor level 385 and is of circular arcuate shape centered at the axis of the pivot shaft 254 (FIGURE 4).

The operation of the modified molding machine 240, shown in FIGURES 4 to 7 inclusive, is generally similar to that of the molding machine 10 described above. Let it be assumed that the mold halves 242 and 244 are closed and clamped as in these figures. The mold cavity or chamber 320 is filled to a predetermined level with the preexpanded plastic beads mentioned above, such as polystyrene beads containing an expanding agent such as pentane, through a flexible hose inserted through the ports 308 in the top walls 282 and 284, as described above. After the mold cavity 320 has been filled to the desired level, the closure plugs 310 are swung downward into closing relationship with their respective ports 308 and clamped tightly by the clamping bolts 316 and nuts 318. Steam at approximately 75 pounds per square inch pressure and 250 degrees F. temperature is then introduced into the mold cavity 320 through the steam supply hoses 334, 342 and 344 from the coupling 338. This steam passes through the respective ports 336, 330 and 350 into the mold cavity 320 and thence through the perforated walls 406 and 408. When the presure in the mold cavity 320 reaches 15 pounds per square inch, the steam supply is automatically cut off. Condensate is drained off through the perforated bottom wall or liner 410 and thence through the ports 374 in the bottom wall 326 into the base chamber 368 and thence through the drain manifold 366 and drain conduit 274 to the sewer or other point of disposal.

As a result of the heat from the steam in the mold cavity 320, the pre-expanded plastic beads now expand further to the maximum extent permited by the space left between them and the top of the mold cavity 320 and by the interstices between them, at the same time uniting themselves to one another to form a hollow cylindrical foam plastic body or block of the shape of the annular mold cavity 320. The steam entering the coupling 338 by way of the steam supply pipe 340 is then shut off and a coolant, such as cool water, is introduced through the water supply pipe 364, coupling 362 and hoses 358 and 360 to the coolant manifolds 352 and 354 at the top of the molding machine 340, flowing into the mold cavity 320 through the upper ports 356. This cool water terminates further expansion and acts upon the hollow cylindrical foam plastic body or block so as to cause shrinkage. As before, this shrinkage is permitted to proceed for several minutes so as to facilitate detachment of the block from the walls of the mold cavity 320.

Following the introduction of the coolant, the cooling water is sut off and meanwhile this has been draining off through the hollow base chamber 368, drain manifold 366 and drain conduit 372. The molded foam plastic block which has been loosened slightly from its previous tight engagement with the adjacent walls 250, 252, 282, 284 of the mold cavity 320 by the shrinkage induced by the action of the coolant, is now ready to be ejected from the mold cavity 320. To accomplish this, the operator releases and swings open the clamping bolts 300 of the clamping devices 292 (FIGURES 5) and then operates the motor 276 to rotate the worms 260 and 262 against their respective worm quadrant gears 256 and 258 to swing the mold halves 242 and 244 horizontally away from one another around the hinge shaft 254 as a pivot. As this occurs, much of the weight of the mold halves is carried by the wheels 418 rolling upon the arcuate track 420.

With the mold halves swung wide open into the dotted line positions of FIGURE 4, the operator supplies pressure fluid to the top of the cylinder 392 of the reciprocatory motor 396, moving the piston 398, piston rod 400 and centering head 402 downward until it is level with the lower end of the inner wall 324 of the core 290, so as to permit the core 290 to be slid outward horizontally along with the foam plastic block until it reaches and clears the top walls 282 and 284 of the open mold halves 242 and 244. It is then transferred to a suitable heated chamber or directly to a slicing machine, in the manner described above for the molding machine 10. Another core 290 is then introduced into the center of the base 328 and centered by shifting the centering head 402 upward by admitting pressure fluid to the bottom of the cylinder 392, whereupon the mold halves 242 and 244 are closed and clamped and the modified molding machine 240 is ready for another molding operation.

What I claim is:

1. A molding machine for expanding plastic material into a molded foam plastic article of predetermined shape, comprising
    an open-topped substantially hollow cylindrical mold body having radially-spaced substantially cylindrical outer and inner perforated side walls and a base wall interconnecting said side walls and defining therewith an open-topped mold cavity;
    a substantially annular vertically-movable perforated bottom wall disposed above said base wall and extending between said side walls,
    a perforated mold cover wall pivotally mounted adjacent the top of said mold body and movable into and out of closing relationship with the top opening of said mold cavity,
    power-operated means for moving said mold cover wall into and out of closing relationship with said mold body,
    means for conducting a heating fluid through both of said side walls, said bottom wall and said cover wall into said mold cavity,
    and pressure-fluid motor means for moving said bottom wall upwardly between said side walls to eject the molded article therefrom, said heating fluid conducting means including a heating fluid manifold substantially encircling said mold body, a cooling fluid manfold substantially encircling said mold body in vertically-spaced relationship to said heating fluid manifold, and a condensate drain manifold substantially encircling said mold body in vertically-spaced relationship to said heating and cooling manifold.

2. A molding machine for expanding plastic material into a molded foam plastic article of approximately hollow cylindrical shape, comprising
    an approximately circular base structure,
    a pair of mold halves having approximately semi-cylindrical side walls and approximately semi-circular top walls pivotally mounted on said base structure for horizontal swinging motion toward and away from one another into closed and open positions respectively,
    a hollow approximately cylindrical core structure mounted on said base structure and extending upwardly therefrom substantially to said top walls and defining therewith and with said base structure and side walls an approximately hollow cylindrical mold cavity,
    power-operated means for swinging said mold halves toward and away from one another,
    means for supplying heating fluid to said mold cavity,
    and means for draining off from said mold cavity the condensate resulting from said heating fluid, said heating fluid supplying means including a pair of approximately semi-circular arcuate heating fluid manifolds, one heating fluid manifold of each pair being secured to the side wall of each of said mold halves, a pair of approximately semi-circular arcuate cooling fluid manifolds also secured to the side wall of each of said mold halves in vertically-spaced relationship to said arcuate heating fluid manifolds, and a condensate drain manifold substantially encircling said base structure in vertically-spaced relationship to said heating and cooling fluid manifold.

3. A molding machine, according to claim 2, wherein movable means comprising a movable centering element is provided for holding said core structure centrally within the mold cavity and is selectively shiftable to enable removal of the molded plastic article from said mold cavity.

References Cited by the Examiner

UNITED STATES PATENTS

| | | | |
|---|---|---|---|
| 654,389 | 7/1900 | Ellinwood et al. | 18—17 |
| 1,590,429 | 6/1926 | Emert. | |
| 1,815,400 | 7/1931 | De Mattia | 18—17 |
| 2,308,948 | 1/1943 | Bosomworth | 18—17 |
| 2,453,568 | 11/1948 | Calleia | 18—6 |
| 2,455,637 | 12/1948 | Wright et al. | 18—6 |
| 2,730,783 | 1/1956 | Kennison | 25—127 XR |
| 2,735,138 | 2/1956 | Luehm et al. | 18—39 XR |
| 2,887,722 | 5/1959 | Bauers | 18—39 |
| 2,948,926 | 8/1960 | Kuhn | 18—39 XR |
| 3,042,973 | 7/1962 | Brockhues et al. | 18—5 XR |

WILLIAM J. STEPHENSON, *Primary Examiner.*